E. STEAD.
LENS MEASURING INSTRUMENT.
APPLICATION FILED JUNE 8, 1916.
1,292,121.
Patented Jan. 21, 1919.
3 SHEETS—SHEET 1.
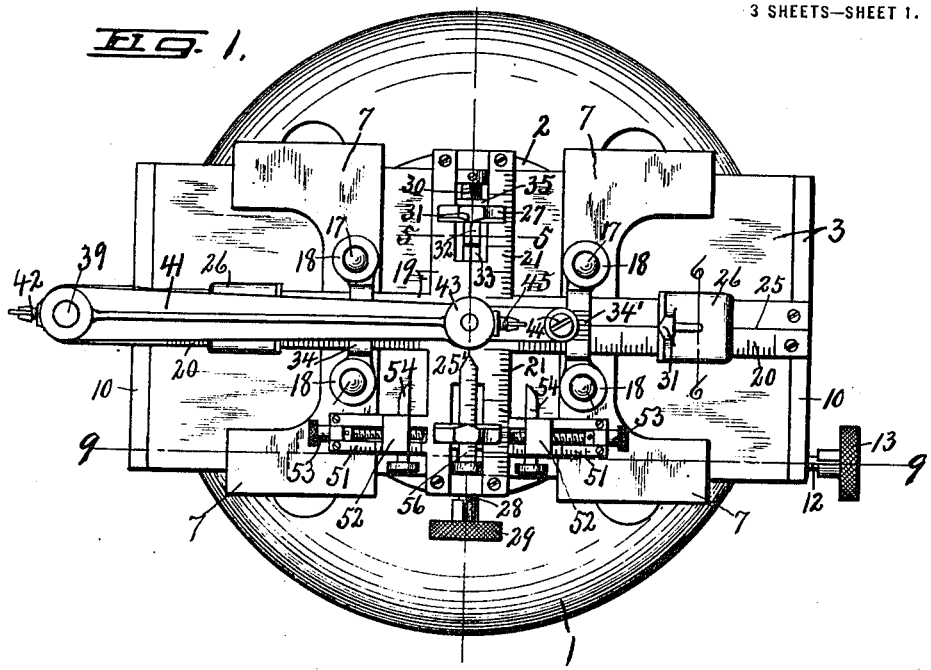
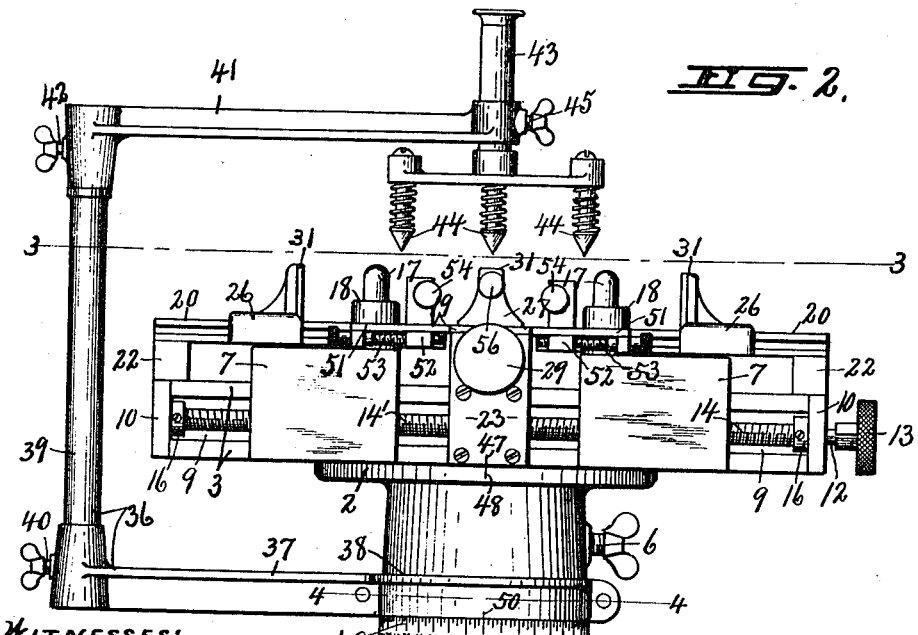

E. STEAD.
LENS MEASURING INSTRUMENT.
APPLICATION FILED JUNE 8, 1916.
1,292,121.
Patented Jan. 21, 1919.
3 SHEETS—SHEET 2.
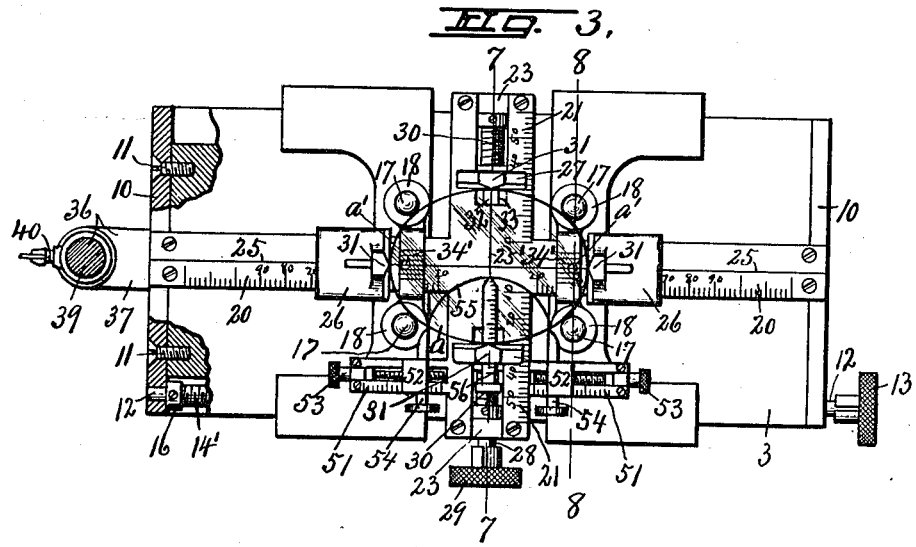
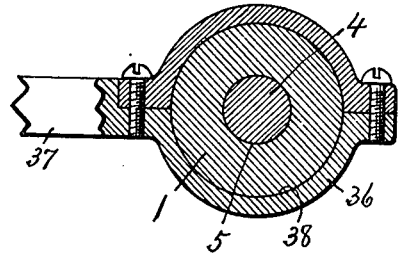
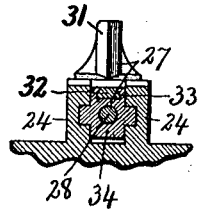
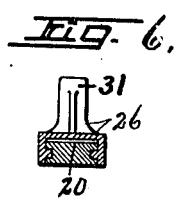
WITNESSES:
INVENTOR
E. Stead
BY Howard P. Denison
ATTORNEY.

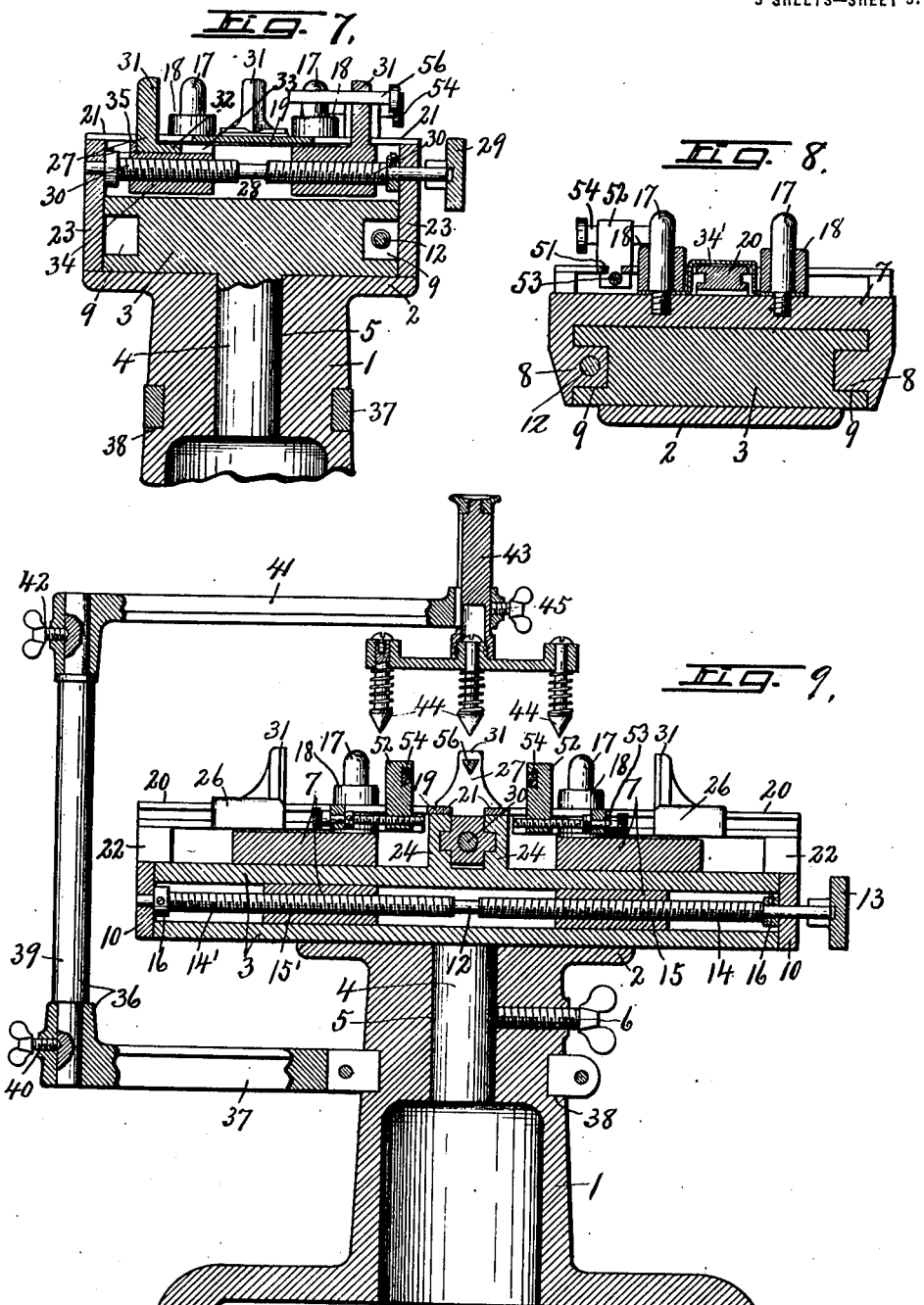

UNITED STATES PATENT OFFICE.

ERNEST STEAD, OF BINGHAMTON, NEW YORK.

LENS-MEASURING INSTRUMENT.

1,292,121.  Specification of Letters Patent.  Patented Jan. 21, 1919.

Application filed June 8, 1916. Serial No. 102,465.

*To all whom it may concern:*

Be it known that I, ERNEST STEAD, a citizen of the United States of America, and resident of Binghamton, in the county of Broome, in the State of New York, have invented new and useful Improvements in Lens-Measuring Instruments, of which the following, taken in connection with the accompanying drawings, is a full, clear, and exact description.

This invention relates to a device for measuring lenses, the main object of which is to accurately determine the optical center, axial lengths and angles of the optical axes of a finished lens in a single setting of the device, and also to test the accuracy of the lens relatively to certain prescribed measurements.

Another object is to ascertain the exact position of the drill holes for the mounting relatively to the major axis in the same setting.

A further object is to permit one of the contacts for measuring the length of the minor axis to be adjusted independently of its opposed contact for measuring the radial difference of irregular lenses.

A still further object is to provide means for marking the exact position of either of the mechanical axes or the optical axis in the same setting of the device according to the prescription.

Other objects and uses relating to specific parts of the device will be brought out in the following description.

In the drawings—

Figures 1 and 2 are, respectively, a top plan and a front elevation of a lens-measuring instrument embodying the features of my invention, the lower portion of the base in Fig. 2 being broken away.

Figs. 3 and 4 are horizontal sectional views taken, respectively, on lines 3—3 and 4—4, Fig. 2.

Figs. 5 and 6 are detail vertical sectional views taken, respectively, on lines 5—5 and 6—6, Fig. 1.

Figs. 7 and 8 are vertical sectional views taken, respectively, on lines 7—7 and 8—8, Fig. 3.

Fig. 9 is a vertical sectional view taken on line 9—9, Fig. 1.

As illustrated, this device comprises a supporting base or standard —1— having a substantially flat top —2— for receiving and supporting a head —3— which is provided with a central pendent stem or spindle —4— journaled in a central vertical opening —5— in the base —1—, the head —3— being adapted to be locked in a certain position against rotation by means of a set screw —6— entering a threaded aperture in one side of the standard —1— for engaging the spindle —4—, as shown in Fig. 9.

The head —3— is preferably rectangular in top plan and elongated in one direction, the opposite ends of the upper face thereof being substantially flat and parallel with the lower face for receiving and supporting a pair of longitudinally movable jaws —7— at opposite sides of the transverse center thereof, said jaws being extended laterally and downwardly across the opposite longitudinal edges of the head —3—, and are provided with inwardly projecting ribs —8—, Fig. 8, slidably fitted in lengthwise grooves —9— in the adjacent edges of said head to guide the jaws in their longitudinal movement toward and from each other and to hold them against upward displacement from the head, the grooves —9— being extended to the ends of the head to permit the jaws to be removed and replaced.

Suitable plates —10—, Fig. 3, are secured by screws —11— to opposite ends of the head to prevent endwise displacement of the jaws therefrom and to form bearings for the end of a jaw-operating spindle —12—, Fig. 9.

This spindle extends through and beyond one of the plates —10— and is provided with a hand-piece —13— by which it may be rotated, the opposite ends of the spindle within the head being provided with right and left-hand threads —14— and —14'— of the same pitch engaging corresponding threaded apertures —15— and —15'— in the adjacent ribs —8— of the jaws —7— for simultaneously moving said jaws in reverse directions as the spindle is rotated.

The spindle —12— is held against endwise movement by collars —16— secured thereto and engaging the inner faces of the opposite end plates —10—.

The jaws —7— are disposed equal distances from and at opposite sides of an intermediate transverse line or fixed center and maintain this relation in all positions of adjustment, each jaw being provided with a pair of lens-centering pins —17— and lens-rests —18—, coaxial individually with said pins —17—, arranged equal distances from and at opposite sides of a medial lengthwise line at right angles thereto, the distance between each pair of pins being less than the length of the minor axis of the lens to be measured so that those of each pair will engage the edges of and center the lens with reference to the fixed point previously referred to when the jaws are properly adjusted by the rotation of the spindle —12—.

A suitable scale plate —19— having lengthwise scale bars —20— and transverse scale bars —21— is secured to suitable upstanding posts —22— and —23— Figs. 2 and 7 and to central transverse ribs —24— Fig. 5 of the head —3— in a horizontal plane substantially parallel with the guideways —9— Fig. 8, and is provided with cross lines —25— and —25'— passing, respectively, through the longitudinal centers of the corresponding scale bars —20— and —21— midway between the centering pins —17— of each pair and midway between the opposite pairs of pins, respectively, and, therefore, intersecting each other at right angles at a point equally distant from each of the pins so as to coincide with the optical center of a regular lens when the latter is clamped between the pins.

The opposite longitudinal edges of the lengthwise scale bars —20— and also the inner faces of the transverse ribs or flanges —24— are grooved to receive slidable end-contact members —26— and slidable side-contact members —27—, the members —26— being movable by hand along their respective scale bars, while the members —27— are adapted to be adjusted simultaneously in opposite directions by means of a spindle —28— which is journaled in any suitable bearings in opposite sides of the head —3—, shown in Fig. 7, and is provided with an external hand-piece —29— and oppositely threaded portions —30— of the same pitch engaging in corresponding threaded apertures in their respective members —27—. In Fig. 7, one member —27— is shown having a separate adjustment as explained later.

Each of the contact members —26— and —27— is provided with an upstanding V-shaped rib —31— disposed at right angles to the scale plate and in exact vertical alinement with their corresponding intersecting lines —25— and —25'—.

The apexes of the ribs of each pair face each other in the same vertical plane as the inner faces of the contact members adjacent the scales so that when the ribs —31— are engaged with the edge of the lens, the inner faces of the bases of the contact members will constitute pointers or indexes by which the distance between the ribs of each pair may be accurately read on said scale.

The scale bars —20— and —21— are preferably graduated in millimeters, the graduations on the bar —20— beginning at a predetermined number of, in this instance twenty (20), millimeters from the transverse center line —25'—, while the graduations on the bars —21— begin a predetermined number of, in this instance ten (10), millimeters from the central lengthwise line —25—.

It, therefore, follows that if a regular elliptical lens is clamped between the pins —17— the adjustment of the clamping members —26— by hand toward each other will bring the ribs —31— into contact with the edges of the lens at opposite ends of the major axis, while the graduation with which the inner edge of either contact member is registered will give the length of the longer radius, or preferably, the length of the major axis because, in this instance, each millimeter graduation is numbered to represent two (2) millimeters, or twice the radial measurement.

In like manner, the adjustment of the contact members —27— toward each other by the rotation of the spindle —28— will cause the ribs —31— to contact with the edges of the lens at opposite ends of the shorter or minor axis, and will indicate on the scale bars —21— the length of the radius, or preferably, the length of the shorter axis, the scale —21— being graduated and numbered in a manner similar to that for the lengthwise scale —20—.

In order that irregular lenses, or those in which the radius of one of the shorter sides is less than that of the other side, may be accurately measured, one of the contact members —27— is preferably made in sections slidable radially one upon the other, as shown in Figs. 5 and 7, in which the base of one of the V-shaped ribs —31— is dove-tailed in cross section at —32— and is fitted in a corresponding groove —33— in the underlying section, as —34—, which is engaged by the adjacent screw —30—, the outer end of the section —34— being provided with a stop shoulder —35— Fig. 7 for limiting the outward movement of the rib section —31— to the same position from the center line as the rib of the opposite section —27—.

It, therefore, follows that when this irregular lens is clamped between the pins —17— with the side of shorter radius adjacent the sectional contact member —27—, the rib —31— of said sectional member may be moved up by hand to contact with the edge of the lens at the end of the shorter radius and will indicate on the scale twice the length of said shorter radius in millimeters, one-half of which may be subtracted from one-half of the reading on the opposite scale to give the difference between the two radii.

In Fig. 3, I have shown a regular elliptical lens —a— as clamped in place by and between the pins —17— with its major axis in exact alinement with the lengthwise line —25— and its minor axis in exact alinement with the transverse line —25'—, Fig. 3, said lens being also shown as provided near its ends with holes —a'— for the reception of the fastening screws for the mounting, said holes being located exactly in the major axis.

It is sometimes necessary, however, to offset these holes to one side or the other of the major axis, and in order that the degree of offset may be accurately measured by this device, I have provided the sliding jaws —7— with separate scale bars —34'— Figs. 1 and 3, which are preferably clamped to the upper faces of the jaws by the pins —17—, as shown, more clearly in Fig. 8, the intermediate portions of said scale bars being arched upwardly across and in close proximity to the upper faces of the lengthwise scale bars —20—, the upper faces of the bars —34'— being graduated in millimeters from opposite sides of the medial line —25— so that if either of the holes —a'— in the lens is offset, the degree of offset will be readily apparent as soon as the lens is clamped between the pins.

Suitable means is also provided in this instrument for testing the accuracy of marking of a major axis, and also for testing the angles of the optical axes relatively to the mechanical axes, and for this purpose I have provided a horizontally swinging frame —36— Fig. 2, consisting of a main supporting arm —37— having one end journaled in an annular groove —38— in the standard —1—, coaxial with the axis of rotation of the head —3—, the outer end of the supporting arm —37— being provided with a relatively rotatable and detachable upright post —39— secured thereto by set screw —40—.

The supporting arm —37— is preferably arranged to swing in a horizontal plane below the head, while the post —39— is located some distance beyond the path of movement of said head and extends above the same for receiving and supporting at its upper end a detachable horizontal arm —41— held in place by a set screw —42—.

This arm —41— extends over the center of the head and is provided with a vertically movable plunger —43— suitably splined on the arm —41— and carrying at its lower end a series of, in this instance three, yielding pins —44—, the plunger —43— and pins —44— constituting what may be termed a marker or angle-measuring device for the mechanical or optical axes of the lens, and is normally held in place some distance above the head by a set screw —45—.

The middle pin —44— is coaxial with the axis of movement of the supporting arm —37— and when moved to its operative position is coaxial with the axis of rotation of the head —3— and in exact vertical alinement with the intersection point of the cross lines —25— and —25'— or mechanical center of the lens. The other pins —44— are located equally distant from the center pin, but within the ends of the major axis. All three pins —44— are arranged in one and the same straight line and it, therefore, follows that by rotating the entire frame —36—, they may be registered with any line passing through the center of the lens.

In testing the angles of any of the axes of the lens, the head —3— is first clamped by the set screw —6— in a certain fixed position, determined by the registration of an index mark —47— on said head with a fixed mark —48— on the top plate —2— of the standard —1—, as shown in Fig. 2, said standard being provided with a circumferential scale —49— indicating degrees or angles numbered in sequence from zero up and adapted to register with the index mark —50— on the swinging support —37— to indicate the arc of movement of the frame —36— and pins —44— from a predetermined position.

For convenience of description, the frame —36— and pins —44— are shown as extending radially parallel with the longitudinal center line —25— or major axis of the lens, from which position the frame —36— may be turned to bring the pins to any angle about the mechanical center of the lens and the set screw —45— loosened to allow the pins to be depressed onto the lens and to be brought into alinement with the optical axis previously marked thereon for testing the accuracy of said axis, or its angle of deflection from the major axis, and also to mark the prescribed optical axis on said lens by simply applying marking ink to the points of the pins, the scale —49— indicating the angle of adjustment of the pins relatively to the major axis of the lens.

When the device is used simply for measuring the length of the axes of lenses, either of the set screws —40— or —42— may be loosened to allow the arm —41— with the marker thereon to be swung out of the way to one side of the head, and, if necessary, the set screw —6— may also be loosened to allow the head to swing to any position most convenient to the operator.

The hand-pieces —13— and —29— are frictionally fitted upon their respective spindles —12— and —28— to turn the same in operating the pins —17— and contact members —27— into and out of engagement with the edge of the lens, but are adapted to slip in case they should be turned after those parts are engaged with the lens to prevent breaking or cracking of such lens, or overstraining of the parts which engage the same.

Suitable means is also provided for measuring the radial width and chord length of the short-focus segment of bifocal lenses, and for this purpose I have provided the scale plate with additional scales —51—, Figs. 1 and 3, extending from opposite sides of the medial line —25'— parallel with the line —25—, along which are movable separate sliding blocks —52— adapted to be operated by separate adjusting screws —53— and carrying separate adjustable gage bars —54— slidable in the blocks —52— parallel with the line —25'— to register their inner ends with the corresponding ends of the bifocal arc as, —55—, Fig. 3, so that when in the latter position the readings on the scales —51— will indicate the distance in millimeters or other units of measurement of each end of the arc from the center line —25'—.

The radial width of the arc —55— from the outer edge of the lens along the line —25'— is determined by a sliding scale bar —56— slidable in an aperture in the front contact member —27— along the line —25'—, and preferably across the top face of the lens in close proximity thereto so that when its inner end is registered with the high point of the arc —55—, the scale thereon will indicate the distance from the center of the arc to the edge of the lens, such distance being measured from the point of the member —56— to the point of contact of the adjacent member —27— with the edge of the lens.

It is now clear that the instrument, although simple in construction, is capable of a wide range of adjustment for making any of the measurements usually prescribed by oculists and opticians, and also permits the lenses to be quickly tested as to their accuracy in accordance with certain prescriptions.

*Operation.*

After the jaws —7— are properly adjusted by means of the screw —12—, the lens is placed upon the rests —18— and its edges engaged by the pins —17— for centering said lens relatively to the intersection of the cross lines —25— and —25'—, whereupon the contact members —26— may be adjusted by hand along their respective scale bars —20— to determine the length of the major axis or either radius thereof.

The contact members —27— may be adjusted by the screw —28— along their respective scale bars —21— until one or both of them contacts with the adjacent edge or edges of the lens, and if the lens is truly elliptical, both members will contact with opposite edges at the same time, each giving the same reading on the corresponding scale bar to determine the length of the minor axis or its radius.

If, however, the lens is irregular,—that is one radius of its minor axis shorter than the other,—the lens would be placed upon the rests —18— with the end of its shorter radius facing the contact rib —31— of the left-hand member —27—, Fig. 7, whereupon said contact rib would be adjusted by hand along the corresponding scale bar —21— to enable the operator to determine the length of the shorter radius of the minor axis, the length of the other radius of the same axis being determined by the corresponding scale of the right-hand member in the said figure.

In determining the position of the hole, as —a'—, in the lens for receiving the lens mounting relatively to the major axis, the graduation on the scale bar —34'— in registration with said aperture will be clearly visible therethrough or through the transparent lens, thus enabling the operator to determine from said scale the exact degree of offset, if any, of said aperture without disturbing any of the other parts of the device after being set to center and hold the lens in operative position for testing, measuring and marking.

If the optical axis of the lens is marked thereon, and it is desired to ascertain the angle of said optical axis relatively to the major axis, the lens may be elevated or adjusted to its zero position as indicated by the index marks —47— and —48—, whereupon the frame —36— carrying the testing and marking pins —44— may be loosened and turned about the circumferential scale —49— until said pins are alined with the optical axis marks on the lens, at which time the circumferential scale —49— will indicate the angle of said optical axis relatively to the major axis.

On the other hand, if the optical axis of the lens is unmarked thereon and it is desired to mark the same to correspond to a certain prescription for that lens, then the frame —36— may be adjusted rotarily from its zero position to bring the pins —44— to the prescribed angle as indicated by the scale —49—, whereupon the points of the pins would be inked in any suitable manner and said pins depressed by hand through the medium of the plunger —43— after loosening the set screw —45— to mark the three pin points upon the lens at the prescribed angle relatively to the major axis, all of said tests, measurements and markings being made at one setting of the lens in the instrument.

What I claim is:

1. In a lens-measuring device of the character described, a head, and means for centering and supporting a lens with reference to a fixed point on the head, in combination with means on the head adjustable radially to said point for engaging an edge of the lens, and means on the head for indicating the distance of said lens-engaging means from the fixed point.

2. In a lens-measuring device of the character described, the combination of a head, means for centering and supporting a lens with reference to a fixed point on the head, contact members movable along and upon said head radially to and at opposite sides of said point for engaging the opposite edges of the lens, and means on the head for indicating the distances of the contacts from said fixed point.

3. In a lens-measuring device of the character described, the combination of a head, a lens holder mounted on the head and provided with means for centering the lens relatively to a fixed point on the head, means adjustable on the head radially said fixed point to contact with an edge of the lens, and means on the head for indicating the distance between said point and edge-contacting means.

4. In a lens-measuring device, the combination of a head, a lens-holder mounted on the head and provided with means for centering a lens relatively to a fixed point on the head, contact members adjustable on the head radially to and at opposite sides of said point to engage opposite edges of the lens, means on the head for adjusting said contact members simultaneously in reverse directions, and means on the head for indicating the distances of said members from said fixed point.

5. In a lens-measuring device, the combination with a lens-holder and a support therefor, said lens-holder having means for centering a lens relatively to a fixed point on the support, of contact members adjustable on the support radially to and at opposite sides of said fixed point to engage opposite edges of the lens, means on the support for adjusting said contact members simultaneously in reverse directions, and means on the support for indicating the distances of said contact members from said fixed point, one of said members having its lens-engaging portion adjustable independently of said adjusting means to conform to lenses having opposite radii of different lengths.

6. In a lens-measuring instrument, a supporting head, means for supporting and centering a lens with reference to a fixed point on the head, a scale on the head radiating from said point, and a contact member movable on the head along the scale for engaging the edge of the lens and indicating the distance of said edge from the fixed point.

7. In a lens-measuring instrument, a supporting head, means on the head for supporting and centering a lens with reference to a fixed point on the head, said head having scales radiating from opposite sides of said point, and contact members movable upon the head along said scales for engaging the opposite edges of the lens.

8. In a lens-measuring instrument, the combination of a head, of means on the head for supporting and centering a lens with reference to a fixed point on the head, said head having scale bars extending radially to and at opposite sides of the fixed point, and contact members movable on the head along said bars for engaging opposite edges of the lens.

9. In a lens-measuring instrument, the combination with a head having scale bars radiating from a common center and provided with straight lines intersecting each other at said center at right angles, of means on the head for centering and supporting a lens in fixed relation to said center, contact members movable along and upon the scale bars for engaging opposite edges of the lens, and means for adjusting the contact members simultaneously in reverse directions.

10. In a lens-measuring instrument, the combination of a head having scale bars radiating from its axis, means on the head for supporting and centering a lens with reference to said axis, and contact members movable along and upon said bars independently of the lens-centering means for contacting with the edges of said lens.

11. In a lens-measuring instrument, the combination of a head, means on the head for supporting and centering a lens with reference to its axis, and a scale bar carried by one of the movable parts of the lens-centering means and extending transversely of the major axis of said lens.

12. In a lens-measuring instrument, the combination of a head, a support therefor, means on the head for supporting and centering a lens with reference to the axis of the head, and means mounted on the support for marking the lens at different points in the said straight line passing through said axis.

13. In an instrument for measuring bifocal lenses, the combination of a head, means on the head for centering and holding a lens with reference to a fixed point on the head, and means on the head adjustable radially relatively to said point for measuring the radius of the arc of the short-focus lens segment.

14. In an instrument for measuring bifocal lenses, the combination of a head, means on the head for centering and holding a lens with reference to a fixed point on the head, and means on the head for measuring the chord length of the arc of the short-focus segment of the lens at the edge of said lens.

15. In an instrument for measuring bifocal lenses, the combination of a head, means on the head for centering and holding a lens with reference to a fixed point on the head, and separate devices on the head for measuring the distances from the ends of the arc of the short-focus segment of the lens to the minor axis of said lens.

In witness whereof I have hereunto set my hand this 29th day of May, 1916.

ERNEST STEAD.

Witnesses:
  H. E. CHASE,
  ALICE M. CANNON.